United States Patent
Lindberg

(10) Patent No.: US 12,208,705 B2
(45) Date of Patent: Jan. 28, 2025

(54) CONTROL INTERFACE FOR INEFFICIENT ELECTRIC MACHINES

(71) Applicant: Volvo Truck Corporation, Gothenburg (SE)

(72) Inventor: Johan Lindberg, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 329 days.

(21) Appl. No.: 17/714,215

(22) Filed: Apr. 6, 2022

(65) Prior Publication Data

US 2022/0332194 A1 Oct. 20, 2022

(30) Foreign Application Priority Data

Apr. 20, 2021 (EP) ..................................... 21169350

(51) Int. Cl.
*B60L 7/10* (2006.01)
*B60L 15/02* (2006.01)
*B60L 58/12* (2019.01)

(52) U.S. Cl.
CPC .............. *B60L 7/10* (2013.01); *B60L 15/025* (2013.01); *B60L 58/12* (2019.02); *B60L 2240/423* (2013.01)

(58) Field of Classification Search
None
See application file for complete search history.

(56) References Cited

U.S. PATENT DOCUMENTS

| | | | |
|---|---|---|---|
| 2005/0255966 A1* | 11/2005 | Tao | B60T 1/10 477/27 |
| 2012/0249024 A1 | 10/2012 | Saha et al. | |
| 2017/0225589 A1 | 8/2017 | Sikand et al. | |
| 2017/0282751 A1 | 10/2017 | Fukuchi et al. | |

FOREIGN PATENT DOCUMENTS

| | | | | |
|---|---|---|---|---|
| CN | 207510232 U | * | 6/2018 | |
| DE | 102019125564 A1 | * | 3/2021 | ............. A47L 11/18 |
| EP | 2055589 A2 | * | 5/2009 | ............. B60K 6/26 |
| GB | 2477229 A | | 7/2011 | |
| KR | 20100040370 A | | 4/2010 | |
| WO | 2013035730 A1 | | 3/2013 | |
| WO | 2013132986 A1 | | 9/2013 | |

OTHER PUBLICATIONS

Morimoto, S. et al., "Loss minimization control of permanent magnet synchronous motor drives," IEEE Transactions on Industrial Electronics, vol. 41, No. 5, Oct. 1994, pp. 511-517.
Extended European Search Report for European Patent Application No. 21169350.2, mailed Oct. 20, 2021, 8 pages.

* cited by examiner

*Primary Examiner* — Melanie Torres Williams
(74) *Attorney, Agent, or Firm* — Withrow & Terranova, PLLC

(57) ABSTRACT

A method performed in a vehicle control unit for controlling an electric machine (EM) of a heavy-duty vehicle, wherein the heavy-duty vehicle comprises an energy storage system (ESS) connected to the EM, the method comprising obtaining an energy absorption capability of the ESS, determining an amount of regenerated energy by the EM during braking, and configuring an efficiency level of the EM in dependence of the energy absorption capability of the ESS relative to the amount of regenerated energy by the EM during braking.

18 Claims, 6 Drawing Sheets

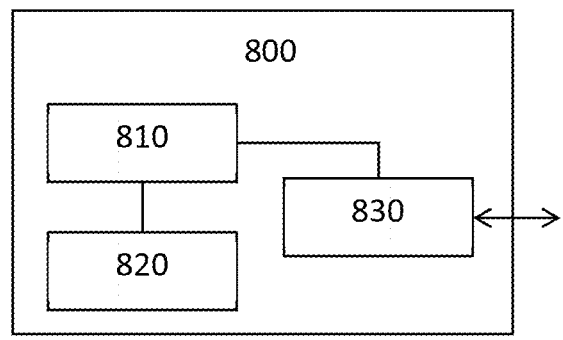
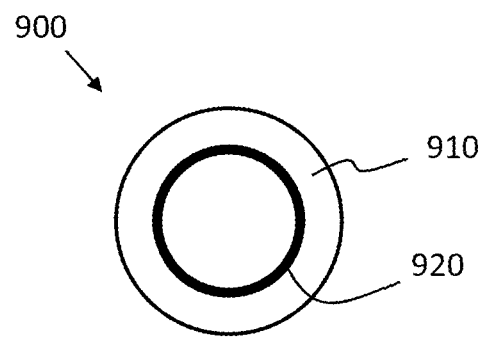
FIG. 8
FIG. 9
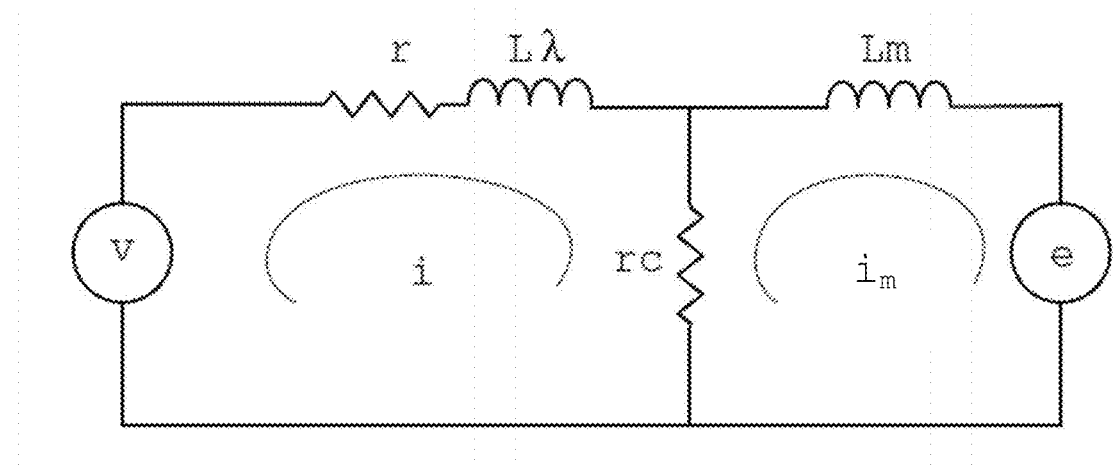
FIG. 10

CONTROL INTERFACE FOR INEFFICIENT ELECTRIC MACHINES

RELATED APPLICATIONS

The present application claims priority to European Patent Application No. 21169350.2, filed on Apr. 20, 2021, and entitled "CONTROL INTERFACE FOR INEFFICIENT ELECTRIC MACHINES," which is incorporated herein by reference in its entirety.

TECHNICAL FIELD

The present disclosure relates to heavy-duty vehicles such as semi-trailer vehicles for cargo transport, and in particular to control interfaces for controlling electric machines. Although the invention will be described mainly with respect to semi-trailer vehicles and trucks, the invention is not restricted to this particular type of vehicle but may also be used in other types of vehicles.

BACKGROUND

A heavy-duty vehicle, such as a truck or semi-trailer vehicle, normally comprises a service brake system based on friction brakes. Friction brakes, such as disc brakes or drum brakes, are highly efficient in generating braking torque. However, if the friction brakes are used too intensively, a phenomenon referred to as brake fading may occur, which is why friction brakes are not suitable for prolonged periods of use that may, e.g., occur when driving downhill for an extended period of time. Brake fading is caused by a build-up of heat in the braking surfaces and leads to significantly reduced braking capability. To avoid brake fading, heavy-duty vehicles often comprise auxiliary brakes capable of endurance braking, such as engine brakes and various retarder systems.

Electric machines can also be used to brake a vehicle. The electric machine may then act as a generator which converts the kinetic energy from the vehicle into electrical energy. This electrical energy can be fed to an energy storage system (ESS) such as a rechargeable battery or the like, resulting in an overall increase in energy efficiency of the vehicle. Surplus energy from regenerative braking can be fed to a brake resistor where it is converted into heat.

Electric machines do not suffer from brake fading, but since the combined energy absorption capability of the ESS and any brake resistors is limited, the electric machine may still not be able to perform endurance braking for prolonged periods of time. Thus, either additional means for braking need to be installed in the vehicle, or the requirements on the electrical energy system of the vehicle must be over-dimensioned to support endurance braking, which is undesired.

SUMMARY

It is an object of the present disclosure to provide improvements in the control of electric machines which facilitate endurance braking by heavy-duty vehicles. This object is at least in part obtained by a method performed in a vehicle control unit for controlling an electric machine (EM) of a heavy-duty vehicle, where the heavy-duty vehicle comprises an energy storage system (ESS) connected to the EM. The method comprises obtaining an energy absorption capability of the ESS, determining an amount of regenerated energy by the EM during braking, and configuring a power loss level or an efficiency level of the EM in dependence of the energy absorption capability of the ESS relative to the amount of regenerated energy by the EM during braking.

This means that the output energy from the EM during braking is dynamically regulated to match the energy absorption capabilities of the ESS. Thus, the endurance capability of the vehicle is extended, which is an advantage. The regulation of efficiency level can be performed in real-time, or in a predictive manner to ensure that both current and future endurance braking capability of the vehicle is satisfactory.

If the ESS is in a state where it can absorb energy then the EM is configured to output current which can be used, e.g., to replenish batteries in the ESS. However, if the ESS is not able to absorb maximum output current from the EM in some vehicle motion scenario, then the energy output from the EM can be reduced by increasing the power loss level at which the EM is operating, which then instead increases the heat generation in the EM. It is an advantage to be able to adjust EM energy output in this manner to facilitate endurance braking, since the energy absorption demands on other vehicle components can be reduced, leading to a less complicated and more cost-effective overall vehicle energy system. Also, since the efficiency level of the EM is modulated in dependence of driving scenario, there is no significant performance penalty on the energy efficiency of the vehicle. A further advantage is that the methods proposed herein can be implemented primarily in software, and so do not require significant changes in vehicle hardware.

If the proposed method is used together with an EM sub-system comprising sufficient cooling capacity, then an endurance braking capability for a heavy-duty vehicle which is possible to sustain almost indefinitely can be realized.

According to aspects, the method comprises determining a state of charge (SoC) of a battery pack comprised in the ESS 120. The SoC often significantly affects the energy absorption capability of the ESS, since a fully charged battery is not able to absorb any significant amounts of energy. A battery which is not fully charged may on the other hand absorb energy while recharging, although it is appreciated that the maximum charging power which can be tolerated often varies from battery to battery.

According to aspects, the method comprises determining a temperature of the battery pack comprised in the ESS 120. Sometimes a battery risks overheating if energy is fed into it at too high rate. By accounting for battery pack temperature, the risk of overheating can be reduced significantly. In case the ESS comprises more than one battery pack, then charging current can be diverted to other battery packs in dependence of temperature. The efficiency level of the EM may be adjusted to mitigate the risk for battery pack overheating. By avoiding overheated battery packs, the life-time of the vehicle ESS can be extended.

According to aspects, the method comprises determining a temperature of a brake resistor comprised in the ESS 120. Brake resistors can be used to dissipate surplus energy by converting it to heat. However, the brake resistor is associated with a maximum operating temperature which must not be exceeded. Thus, the efficiency level of the EM may need to be adjusted in dependence of the brake resistor temperature in order not to risk overheating the brake resistor.

According to aspects, the method comprises determining a state of a retarder system arranged to provide a braking torque to prevent acceleration by the heavy-duty vehicle. Retarder systems may be used to slow down heavy-duty vehicles in an efficient manner. However, most retarder systems also have operational limits. For instance, some retarder systems may overheat if used to intensively. By regulating the EM power loss level, more negative torque can be provided by the EM to spare the retarder systems, without generating excess energy which cannot be absorbed by the ESS.

According to aspects, the method comprises predicting an amount of regenerated energy from the EM based on a planned route of the vehicle. The planned route of the vehicle can for instance be used to determine a height profile indicating uphill sections of road and downhill sections of road, and the amount of regenerated energy along the path can therefore be predicted. Stored data related to regenerated energy along some path previously travelled by the vehicle or by some other vehicle can also be used for this purpose. This predicted amount of regenerated energy can be compared to the energy absorption capabilities of the vehicle ESS. Thus, a more long-term control of EM efficiency level is possible. This means that, even if the ESS is capable of absorbing the entire EM energy output during braking at some particular point along the route, the efficiency level can still be reduced with advantage in order to allow more negative torque to be generated by the EM at a future section along the planned route. For instance, a long downhill drive may be comprised in the route which necessitates a certain room in the ESS for absorbing energy in order to allow for endurance braking during the entire downhill section. The efficiency level of the EM can, by the proposed methods, be reduced in in good time before the long downhill drive in a predictive manner to ensure endurance braking capability is maintained along the entire planned route.

According to aspects, the method comprises measuring an amount of regenerated energy by the EM. The amount of regenerated energy by the EM for a given efficiency level or power loss setting may not be easily predicted in advance by analytical methods or by computer simulation of the EM/ESS combination. However, by measuring the energy output from the EM, the efficiency level can be adjusted to reach a target energy output level. This way a closed loop control system is formed which can be operated with high reliability, which is an advantage. Also, the amount of regenerated energy by the EM can be stored in memory together with data indicative of the route at which the regeneration was performed, which can be used to predict energy regeneration as mentioned above.

According to aspects, the method comprises determining a maximum amount of regenerated energy by the EM based on a vehicle load and an endurance braking requirement of the vehicle. This feature is akin to a functional safety feature of the heavy-duty vehicle. By ensuring that the efficiency level of the EM is always modulated in order to meet a requirement on endurance braking, the requirements on other braking systems of the vehicle may be possible to reduce, which is an advantage. In other words, if the EM efficiency control is configured such as to guarantee a certain endurance braking capability of the vehicle, then other forms of endurance braking devices may not be required, which is an advantage.

According to aspects, the method comprises configuring the efficiency level of the EM as a D/Q setpoint determined under constraints of a desired motor torque and power loss level. This is an advantage since it allows many of the features discussed herein to be implemented as software changes to an existing design.

According to aspects, the method comprises sending a requested power loss from the vehicle control unit to an EM control unit. This new interface feature allows a control unit to request a desired power loss, say 5 kW, from the EM. This power loss can often be maintained by the EM even though no torque is generated by the EM, which is an advantage since the energy flow to and from the ESS can be regulated in this manner. In fact, when no torque is generated and the EM still draws power from the ESS, then the EM implements a function similar to that of a brake resistance for dissipating energy.

According to aspects, the method comprises sending a power loss status report from the EM control unit to the vehicle control unit. This status report is like a capability report informing the control unit of the current state of the EM with respect to power loss, and optionally what its capabilities are in terms of increasing or decreasing the power loss, i.e., the method optionally comprises sending a power loss capability report from the EM control unit to the vehicle control unit. The capability report may advantageously also comprise a time factor comprising information about how long the current power loss can be maintained.

According to aspects, the power loss capability report is determined based on a temperature level of the EM. The temperature of the EM plays an important role in what efficiency levels that can be maintained by the EM, since a reduced efficiency necessarily results in a temperature increase of at least some components of the EM. If the EM is running hot, the efficiency level may need to be increased at least temporarily in order to not overheat the EM or some of its components.

According to aspects, the method comprises configuring the efficiency level of the EM in dependence of a minimum power output of a fuel cell stack. This is an advantage since a fuel stack is normally not very easy to turn off and always generates a minimum amount of output power. By configuring the efficiency level of the EM in dependence of the minimum output power of the fuel cell stack, the fuel cell stack can be kept running, and the EM can be used to absorb the excess energy from the fuel cell stack even if the ESS is not capable of absorbing any energy from the fuel cell stack.

According to aspects, the method comprises configuring a gear ratio associated with a transmission of the heavy-duty vehicle. The efficiency of an EM is often also a function of gear ratio. Thus, by allowing for configuration of the gear ratio an increased control freedom is obtained.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 8 schematically illustrates a control unit;

FIG. 9 shows an example computer program product; and

FIG. 10 shows an example circuit model.

DETAILED DESCRIPTION OF EXAMPLE EMBODIMENTS OF THE INVENTION

Figure 1:
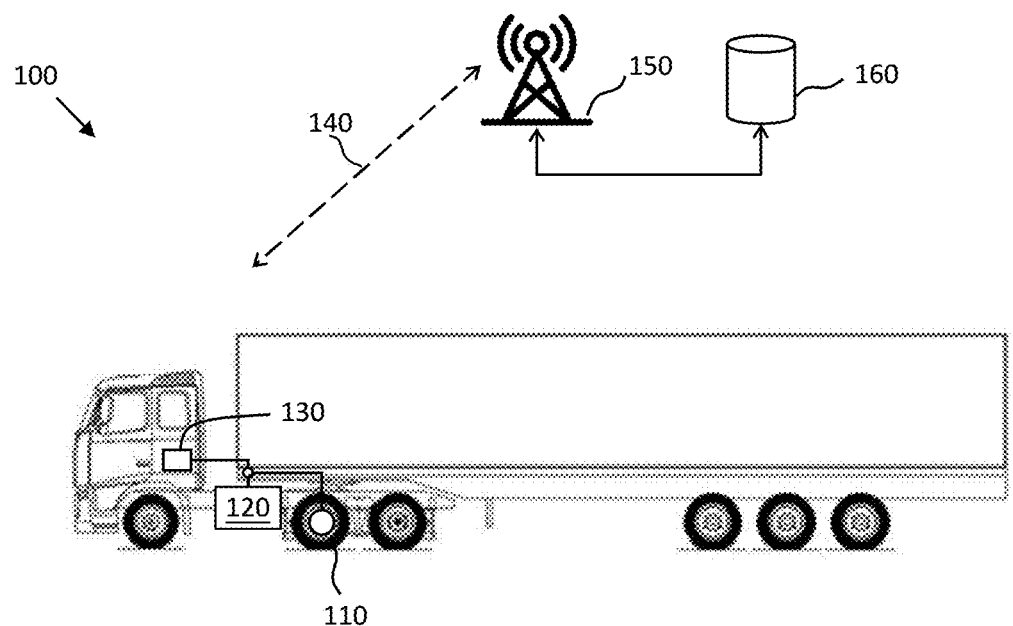
FIG. 1 shows an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example heavy-duty vehicle 100 for cargo transport. The vehicle combination 100 comprises a truck or towing vehicle configured to tow a trailer unit in a known manner, e.g., by a fifth wheel connection. Herein, a heavy-duty vehicle is taken to be a vehicle designed for the handling and transport of heavier objects or large quantities of cargo. However, a heavy-duty vehicle could also be a vehicle designed for use in construction, mining operations, and the like. It is appreciated that the techniques and devices disclosed herein can be applied together with a wide variety of electrically powered vehicle units, not just that exemplified in FIG. 1. In particular, the techniques disclosed herein are also applicable to, e.g., rigid trucks and multi-trailer electric heavy-duty vehicles comprising one or more dolly vehicle units.

The vehicle 100 is an electrically powered vehicle comprising one or more electric machines (EM) 110. The one or more EMs are arranged to generate both positive and negative torque, i.e., to provide both propulsion and braking of the vehicle 100. The vehicle 100 also comprises an energy storage system (ESS) 120 configured to power the one or more EMs. The ESS 120 may comprise a battery pack and potentially also a fuel cell (FC) stack arranged to generate electrical energy from a hydrogen storage tank on the vehicle 100 (not shown in FIG. 1). The ESS optionally also comprises a brake resistance arranged to dissipate surplus energy which the electrical energy storage devices on the vehicle 100 cannot accommodate.

A vehicle control unit 130 is arranged to monitor and control various vehicle operations and functions. The vehicle control unit is, e.g., arranged to monitor and control the ESS 120 as well as the one or more EMs 110, and optionally also the operation of the FC stack. The vehicle control unit 130 may also comprise higher layer control functions such as vehicle route planning and may have access to geographical data comprising height profiles of different planned vehicle routes and the like, as well as positioning data indicating a current location of the vehicle 100.

The vehicle 100 optionally comprises a wireless communications transceiver arranged to establish a radio link 140 to a wireless network 150 comprising a remote server 160. This way the control unit 130 may access the remote servers 160 for uploading and downloading data. Notably, the vehicle 100 may store measurement data such as amounts of regenerated energy by the one or more EMs 110 at various geographical locations an along different vehicle routes in local memory or at the remote server 160. The vehicle control unit 130 may also query the remote server for information about previously experienced amounts of regenerated energy, and/or temperature increases in various vehicle components along a given route.

The vehicle control unit 130 may furthermore be arranged to obtain data indicative of an expected rolling resistance for a given route, either from manual configuration or remotely from the remote server 160. The rolling resistance of the vehicle 100 will affect the energy consumption of the vehicle as it traverses a route. For instance, a gravel road is likely to require more energy compared to a more smooth asphalt freeway. Also, friction and air resistance will reduce the requirements on generating negative torque during downhill driving.

It is required to be able to brake the vehicle 100 as it travels down steep long hills and the like, where friction brakes risk onset of brake fading. The EMs 110 on the vehicle 100 may, as mentioned above, be used to generate braking torque. Electrical energy from the EMs generated during braking can then be fed to the ESS as long as the ESS can absorb the power, resulting in recuperated energy and a more energy efficient vehicle operation, which is an advantage. However, when the batteries of the ESS are fully charged, no more energy can be absorbed. Furthermore, there may be a limit on maximum current or voltage that can be fed to the batteries of the ESS when charging. If the batteries in the ESS cannot accept all of the output energy from the electric machines, surplus energy can be fed to the brake resistor which then dissipates the surplus energy as heat. However, a brake resistor also has a maximum amount of power it can absorb since it will eventually get too hot. Furthermore, there is normally a peak power capability of the brake resistor, i.e., there may be a limit on maximum current or voltage that can be fed to the brake resistor.

If the battery on the vehicle 100 is fully charged and if the brake resistor has reached a maximum allowable temperature, there is no safe way of dispersing the power generated from the electric machine during braking. This problem can be alleviated somewhat by over-dimensioning the brake resistor, but this solution is not desired since it drives cost and component complexity.

An electrical motor is normally operated at maximum efficiency, meaning that maximum output power is generated during regenerative braking in order to recuperate as much energy as possible during downhill driving. However, it has been realized that there is a control freedom associated with electric machines which allow most electric machines to be operated at a reduced efficiency. The general principles of such sub-optimal energy efficiency electric machine control are described in, e.g., GB2477229B and also in US 2017/0282751 A1. An electric machine used to generate braking torque which is operated in a less energy efficient mode of operation will generate more heat and less output current compared to an electric machine that is operated at maximum efficiency.

The present disclosure builds on the work in GB2477229B and US 2017/0282751 A1 and provides a control mechanism and a communications interface which allows the vehicle control unit 130 to balance electrical current output from the EM 110 during regenerative braking with a temperature increase in the EM during braking. In essence, the control unit 130 is, by the proposed technique, able to balance EM temperature increase with ESS energy absorption capability during extended periods of down-hill driving, thereby providing an improved endurance braking capability for the heavy-duty vehicle 100 and thus a reduced need for over dimensioning the components of the vehicle 100. The control signaling between the vehicle control unit and the one or more electric machines on the vehicle is versatile and allows for an efficient and robust control of the electric vehicle propulsion system. According to a preferred implementation, the control unit 130 also balances the current output of the EM during driving in a predictive manner. For instance, suppose a route involves an initial flat stretch of road followed by a long downhill section. The control unit may then configure the EM in an energy inefficient mode of operation to consume more power during the drive on the flat stretch of the route, in order to ensure sufficient endurance braking capability during the long downhill part of the route.

Figure 2:
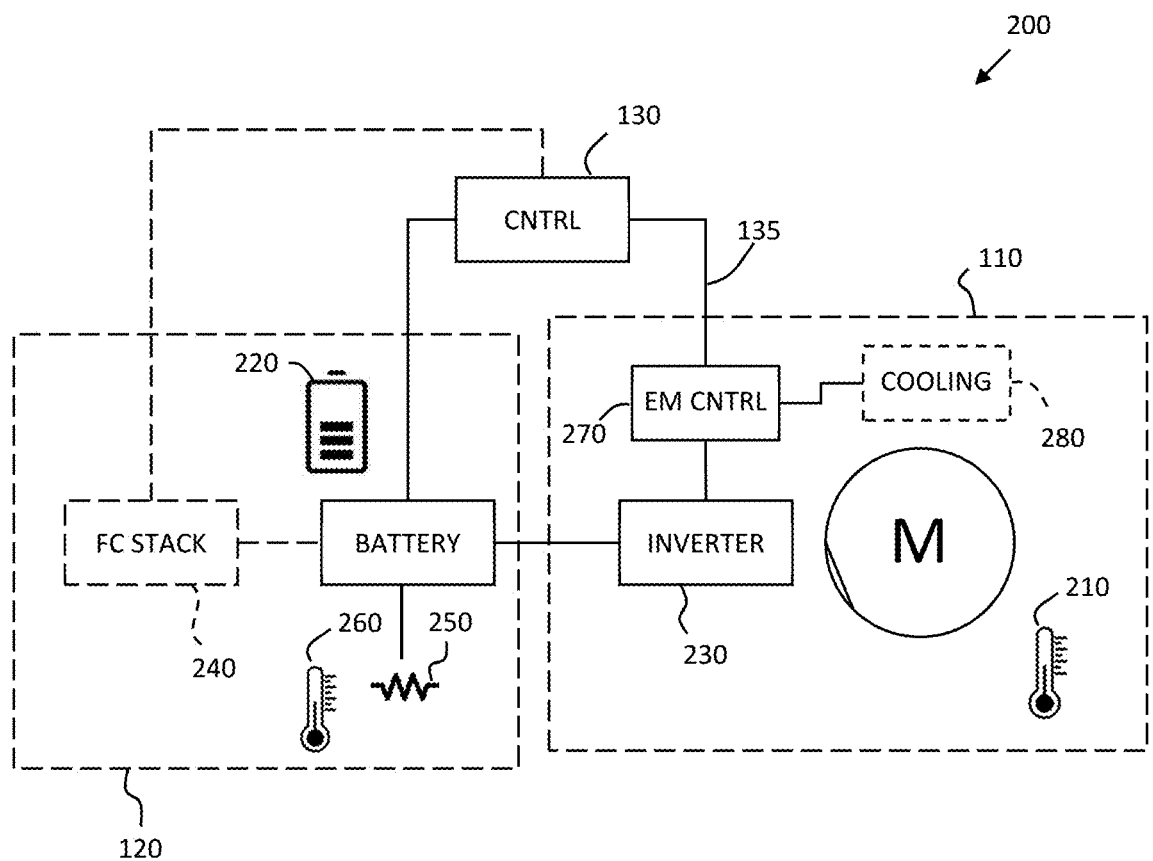
FIG. 2 schematically illustrates an electric machine control system.

FIG. 2 illustrates an example vehicle propulsion system 200 comprising an EM 110, an ESS 120 and a vehicle control unit 130. The EM 110 here comprises an EM control unit 270 arranged to control the operation of an inverter 230 which drives the electric machine. The EM is associated with an EM temperature 210, which may relate to, e.g., a temperature of the stator windings and/or to other components in the EM. It is appreciated that the different components of an electric machine are associated with a specification regarding maximum temperatures. If those temperatures are exceeded, then the respective EM components risk malfunction or will at least suffer an increased wear. The EM control unit 270 is arranged to communicate with the vehicle control unit 130 over a control interface 135. Various control messages may be exchanged over this interface 135. For instance, the vehicle control unit 130 may use the interface 135 to configure a degree of efficiency, or a power loss level of the EM subsystem 110. The EM sub-system 110 may also use the interface 135 to report back capabilities to the vehicle control unit 130. Thus, advantageously, if the vehicle propulsion system comprises more than one EM, or even more than one EM subsystem, such as different EM subsystems on different vehicle units, then the vehicle control unit 130 may communicate with the EM subsystems and balance regenerative braking efficiency in dependence of their respective capabilities and energy absorption capabilities of the vehicle ESS 120.

The EM subsystem 110 may, as mentioned above, be operated at varying degrees of efficiency. An EM used for propulsion of a vehicle 100 is normally operated at maximum efficiency, which means that a maximum output current always results from applying negative torque, in order to recuperate as much energy as possible. However, as explained in GB 2477229 B and US 2017/0282751 A1, the currents in the stator windings of the EM can be controlled such that this efficiency is reduced significantly. Furthermore, it has been realized that this efficiency can be controlled by the control unit 130 in real time, or at least close to real time, in dependence of the energy efficiency capability of the EM 110 and in dependence of the energy absorption capability of the ESS 120. This way the control unit 130 can obtain both an energy efficient operation by the vehicle 100 by maximizing energy efficiency as long as the ESS 120 is able to absorb the generated output current during regenerative braking, and also an increased capability of endurance braking if needed, by reducing the efficiency of the EM 110, i.e., increasing the EM power loss, thereby reducing output energy from the EM during regenerative braking and instead raising the internal temperature of the EM 110. In fact, a power loss can even be configured at zero torque, in which case the EM start to act like a brake resistance which dissipates energy from the ESS.

It is appreciated that the configuration of EM efficiency level is equivalent to the configuration of a power loss level of the EM. As will be explained in the following, the techniques disclosed herein are applicable also when no torque is generated by the EM, in which case a definition of efficiency may be cumbersome. Thus, herein, a power loss level is the same thing as an efficiency level, although the term power loss level is preferred when discussing EM operation involving zero torque.

Advantageously, an EM where the efficiency level is configurable in this manner also comprises a higher capacity cooling system, such as an oil-based cooling system with a sufficiently sized heat exchanger and fan. The higher the cooling capacity of the EM, the less power efficient it can be for extended durations of time. In fact, with a sufficiently dimensioned cooling system, the EM can be designed to provide endurance braking for an unlimited duration of time, at least for certain vehicle maximum load and the like.

The cooling of the EM can also be adjustable, e.g., by adjusting a fan speed or flow rate of cooling liquid to provide additional cooling when the EM is configured in an energy inefficient mode of operation, i.e., at high power loss. Thus, according to some aspects, the control unit 130 is configured to control a variable cooling 280 of the EM 110 in dependence of the efficiency level at which the EM is configured, such that increased cooling is performed when the EM is operated in an energy inefficient mode of operation, that is, at a high power loss setting.

The ESS 120 of the vehicle propulsion system 200 comprises a battery pack connected to an optional brake resistor 250 for dissipating surplus energy. An optional FC stack 240 is also indicated as comprised in the ESS 120. The ESS 120 is associated with a state of charge (SoC) 220 indicating, e.g., how much charge that is currently carried by the battery pack. Of course, one or more components of the ESS 120 may also be associated with a temperature 260, where it is appreciated that some components may risk permanent damage or at least temporarily reduced function is overheated. The temperature of the brake resistor 250 can be expected to vary with surplus energy. If it is used to dissipate large amounts of energy, then it may reach critical temperatures, which is of course undesired. The FC stack 240 is normally difficult to turn off and re-start since it takes time to do this without damaging the FC stack. Thus, it is preferred to always generate some power by the FC stack 240, even if the ESS is close to full SoC and the vehicle is driving downhill. One advantage of the techniques disclosed herein is that the efficiency level of the EM subsystem 110 can be configured at a constant power loss value corresponding to the minimum output power from the FC stack, thus compensating for the energy contribution by the FC stack.

Figure 7:
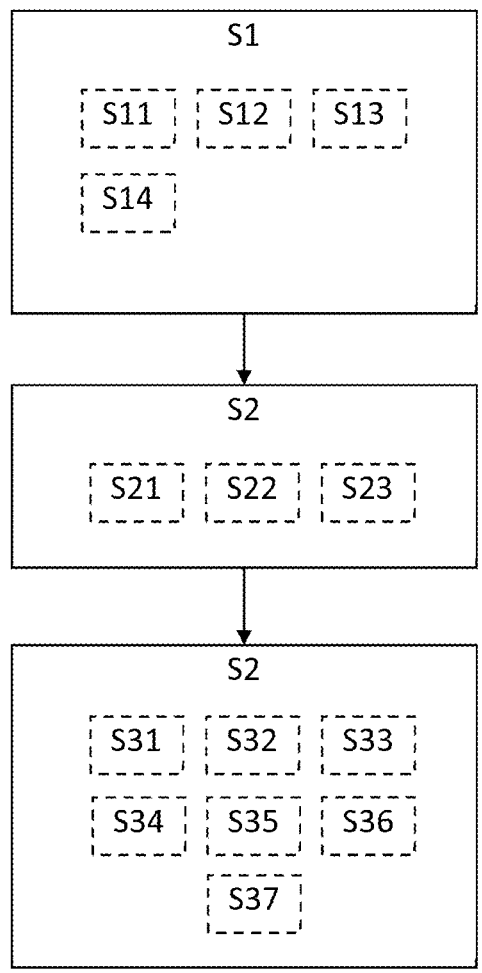
FIG. 7 is a flow chart illustrating a method.

FIG. 7 shows a flow chart which summarizes the methods discussed herein. There is disclosed a method performed in a vehicle control unit 130 for controlling an electric machine (EM) 110 of a heavy-duty vehicle 100 which comprises an energy storage system (ESS) 120 connected to the EM 110. The method comprises obtaining S1 an energy absorption capability of the ESS 120. This energy absorption capability of the ESS is likely to vary over time, and can be monitored by the control unit 130, e.g., by determining S11 a state of charge (SoC) 220 of a battery pack comprised in the ESS 120, by determining S12 a temperature of the battery pack comprised in the ESS 120, and/or determining S13 a temperature 260 of a brake resistor 250 comprised in the ESS 120. The relationship between energy absorption capability and these different parameters can be pre-configured at the factory when the vehicle 100 is assembled, e.g., as a look-up table or the like in a memory accessible from the control unit 130, and/or regularly provided as part of a software update. Energy absorption capability in terms of power may be limited by an upper power limit which depends on the design of the ESS, i.e., the rating of the components comprised in the ESS. The capability of the ESS in terms of power is normally also dependent on temperature. For instance, brake resistance temperature impacts energy absorption capability negatively, since a very hot braking resistance may not be able to absorb very much energy until it has cooled down again. The energy absorption capability in terms of energy amount is often a linear function of state of charge, where a nearly fully charged battery pack cannot absorb so much energy, and a nearly empty battery pack is able to absorb a significant amount of energy.

A retarder is a device used to augment some of the functions of primary friction-based braking system, usually on heavy-duty vehicles. Retarders serve to slow vehicles down or maintain a steady speed while traveling down a hill and help prevent the vehicle from "running away" by accelerating down the hill. They are not usually capable of bringing vehicles to a standstill, as their effectiveness diminishes as vehicle speed lowers. They are instead used as an additional "assistance" to slow vehicles, with the final braking done by a conventional friction braking system or a brake system based on electric machines. As the friction brake will be used less, particularly at higher speeds, their service life is increased. The braking capability of a retarder system is a function of the state of the retarder, such as its temperature. The method may furthermore comprise determining S14 a state, such as a temperature or other metric indicative of a braking capability, of a retarder system arranged to provide a braking torque to prevent acceleration by the heavy-duty vehicle 100. Various retarder systems are known, such as water retarders and oil retarders.

An increased accuracy in determining the energy absorption capability of the ESS can be obtained if the behavior of the ESS is monitored during vehicle operation, and the dependence between energy absorption capability and vehicle component state is recorded. For instance, the effect of temperature on the behavior of the ESS can be monitored and a record of energy absorption capability can be maintained, which can then be consulted if an energy absorption capability is to be determined in the future. Data related to energy absorption capability of the ESS can also be communicated to the remote server 160, which may then construct a model of ESS energy absorption capability to be shared with other vehicles of the same type or comprising the same type of ESS.

The method also comprises determining S2 an amount of regenerated energy by the EM 110 during braking. The amount of energy regenerated by the EM 110 during braking can of course be determined simply by measuring S21 the amount of regenerated energy by the EM 110. However, it is also possible to predict S22 the amount of regenerated energy from the EM 110 based on a planned route of the vehicle 100.

Figure 3:
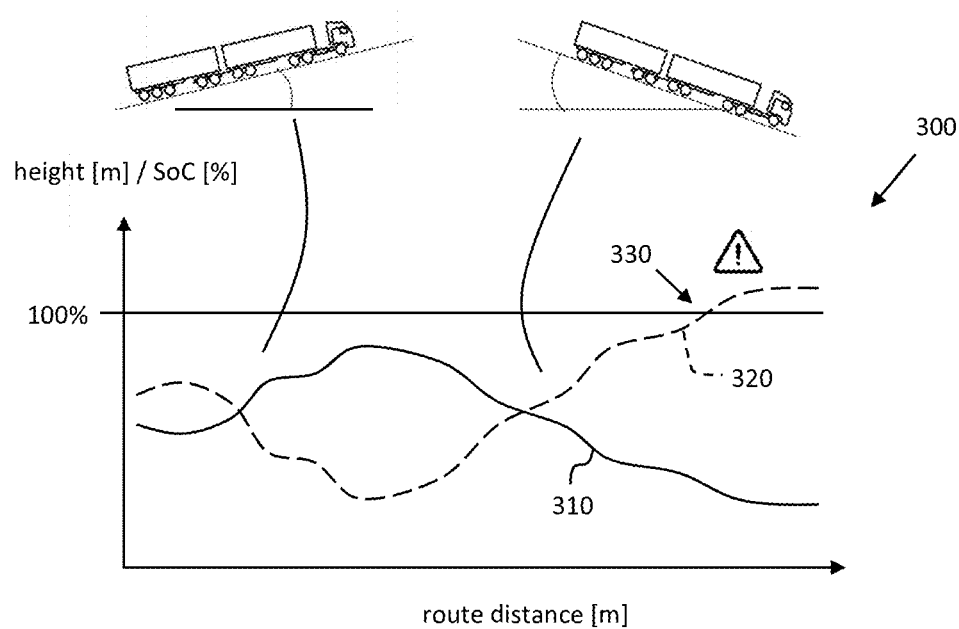
FIG. 3 illustrates energy consumption by a vehicle along a route.

FIG. 3 illustrates an example 300 of a height profile along a planned vehicle route (shown as a solid line). The dashed line in FIG. 3 illustrates an expected SoC along the same route for a nominal value of configured electric machine efficiency. It can be seen that the SoC decreases in uphill sections of the route and increases in downhill sections of the route. At the end of this route the expected SoC exceeds 100%, which is undesired. This can be avoided by using the method of the present disclosure, i.e., by proactively increasing the power losses in the electric machine, whereby energy is instead converted into heat inside the EM subsystem instead of being output from the EM subsystem as electrical current. The expected SoC in FIG. 3 may be determined from the current energy absorption capability of the ESS and the expected energy generation from regenerative braking. The estimated energy generation (in Joules and/or Watts) from regenerative braking in a given driving scenario for different power loss configurations can be tabulated beforehand by experimentation and/or mathematical analysis which may involve computer simulation. However, additional advantages can be obtained if the energy generation in different operating conditions is logged, perhaps in collaboration with other vehicle via the remote server 160. This way the accuracy of the estimated amount of energy that can be expected from regenerative braking in different driving conditions and with different energy efficiency settings of the EM systems on the vehicle 100 can be improved. For instance, if a given vehicle driving down a hill having a certain slope and carrying a given amount of cargo generates a certain amount of energy, then this amount and the driving conditions can be written to memory, and optionally communicated to the remote server 160. The next time the vehicle drives down a similar slope carrying a similar load, the estimate of generated energy will be more accurate. The vehicle may also download relevant data from the remote server 160 indicative of an expected behavior of the EM along some given route. Interpolation can of course be used to estimate energy generation for a scenario which resembles some already experienced scenarios. This way the estimate of the regenerative amount of energy for different configurations of electric machine energy efficiency is further improved since more data will be available.

The rolling resistance can, as mentioned above, also have an effect on the energy consumption of the EM as the vehicle 100 traverses a route. The rolling resistance can often be accurately predicted based on information related to the road properties, such as if the road is a gravel road or a smooth freeway. The rolling resistance is also at least partly a property of the vehicle 100, and its tyres.

Interestingly, the vehicle may upload the "ESS SoC profile" 320 corresponding to travelled routes to the remote server 160. The remote server 160 can then store this information, an make it available for other vehicles. Thus, a vehicle planning a transport mission can query the remote server 160 to see if an ESS SoC profile is available for the planned route. If this is the case, then the vehicle can download the SoC profile from the remote server and use this SoC profile to plan EM efficiency level configuration for the duration of the route. This ensures that the vehicle maintains an endurance braking capability for the entire route.

The methods may also comprise determining S23 a maximum amount of regenerated energy by the EM 110 based on a vehicle load and an endurance braking requirement of the vehicle 100. The vehicle 100 may, e.g., be required to be able to limit speed when driving downhill for longer distances, i.e., the vehicle may be associated with an endurance braking capability requirement. This requirement together with a minimum energy absorption capability of the vehicle ESS can be translated into a maximum allowable efficiency of the electric machines on the vehicle. The required longitudinal torque can be expressed as $$F_{x,req} = m_{GCW} a_{x,req} + 0.5 C_d A_f \rho_{air} v_x^2 + g C_r m_{GCW} + m_{GCW} g \sin\left(a\tan\left(\frac{s}{100}\right)\right)$$

where $m_{GCW}$ is the vehicle gross combination weight, $a_{x,req}$ is the required retardation, $C_d A_f$ is the product of air drag coefficient $C_d$ and vehicle front area $A_f$, $\rho_{air}$ represents air density, $v_x$ is the vehicle speed, g is the gravitational constant, $C_r$ is rolling resistance, and s is a slope percentage between 0 and 100. Using this equation, e.g., the required torque for a planned route can be obtained for nominal value of air resistance (or air drag coefficient, front area etc.). The required torque can in turn be used to determine the energy generation during downhill sections. In case the energy absorption capability of the ESS goes below the required level and/or if the capability of the EM in terms of minimum efficiency increases, then the vehicle control unit 130 may trigger a warning signal, or even prevent vehicle operation.

The method also comprises configuring S3 a power loss level or an efficiency level of the EM 110 in dependence of the energy absorption capability of the ESS 120 relative to the amount of regenerated energy by the EM 110 during braking. This may, e.g., be achieved by configuring S31 the efficiency level of the EM 110 as a D/Q setpoint determined under constraints of a desired motor torque and power loss level, as was discussed in, e.g., GB 2477229 B and US 2017/0282751 A1. In this way, the vehicle control unit 130 balances the efficiency level of the electric machines on the vehicle 100 such that the amount of regenerated energy during downhill driving does not exceed the energy absorption capabilities of the vehicle ESS. As discussed above, the efficiency level of the EM 110 may be expressed in terms of a power loss in absolute or relative terms. An absolute measure of power loss may, e.g., be measured in Watts (W), while a relative power loss level may be measured, e.g., in terms of a percentage with respect to maximum efficiency. It is appreciated that the techniques disclosed herein are applicable also when no torque is generated by the EM, where the EM still can be configured to draw power from the ESS.

The technique of configuring a power loss level or an efficiency level of the EM 110 in dependence of the energy absorption capability of the ESS 120 may involve a model and a calculation method to optimize the power losses of a permanent magnet synchronous electric machine with respect to some target performance criteria. The adjustment of efficiency level of an electric machine is a generally known technique and will therefore not be discussed in detail herein. We instead refer to examples from the literature for more details and implementation examples, e.g., GB2477229B and US 2017/0282751 A1.

The example circuit model and calculation method provide separation of the power losses associated with the winding power loss and core power losses for a machine, for different dc voltages and axle speeds. The algorithm calculates the current set-points in direct and quadrature dimension ($i_d$, $i_q$) that provides a certain power loss for a given torque request, dc voltage $U_{dc}$, maximum current $I_{max}$ and axle speed ω.

The electric machine model is represented by the circuit model shown in FIG. 10. This model is an extension to the model provided by S. Morimoto, T. Ti, Y. Takeda, and T. Hirasa, in "Loss minimization control of permanent magnet synchronous motor drives," IEEE Transactions on Industrial Electronics, vol. 41, pp. 511-517, October 1994. The model comprises a leakage inductance $L_\lambda$, a mutual inductance: $L_m$, and two resistances r and $r_c$, where resistance r is associated with the $C_u$-losses (electric machine variable losses) and the resistance $r_r$ is associated with the core losses in the electric machine. There is also a back-EMF denoted here by e which is associated with the permanent magnetic flux of the electric machine. The voltage v is the applied voltage from the inverter, i.e., the motor drive circuit. Generally, below, subscript d denotes direct dimension and subscript q denotes quadrature dimension. Electric machine axle speed is denoted by ω and generally denotes flux.

The corresponding state space equation for machine state $\vec{x} = (i_{m^d}, i_{m^q}, i_d, i_q)$, with respect to the circuit model in FIG. 10, is given by following expression, $$\begin{cases} \dfrac{d\vec{x}}{dt} = A_c \vec{x} + B_c \begin{pmatrix} e \\ v_d \\ v_q \end{pmatrix} \\ \begin{pmatrix} i_d \\ i_q \end{pmatrix} = C_c \vec{x} \end{cases}$$

where ($i_{m^d}$, $i_{m^q}$) denotes direct and quadrature components of the current related to the mutual inductance $L_m$, ($i_d$, $i_q$) denotes direct and quadrature components of the current set-point, $e = \omega \psi_m$, $\psi_m$ is permanent magnet flux, and where the matrices in the synchronous to angular frequency dq-framework yields:

$$A_c = \begin{pmatrix} -\dfrac{r_c^d}{L_{m^d}} & \dfrac{\omega L_{m^q}}{L_{m^d}} & \dfrac{r_c^d}{L_{m^d}} & 0 \\ -\dfrac{\omega L_{m^d}}{L_{m^q}} & -\dfrac{r_c^q}{L_{m^q}} & 0 & \dfrac{r_c^q}{L_{m^q}} \\ \dfrac{r_c^d}{L_\lambda} & 0 & -\dfrac{r_c^d + r}{L_\lambda} & \omega \\ 0 & \dfrac{r_c^q}{L_\lambda} & -\omega & -\dfrac{r_c^q + r}{L_\lambda} \end{pmatrix}$$

$$B_c = \begin{pmatrix} 0 & 0 & 0 \\ -\dfrac{1}{L_{m^q}} & 0 & 0 \\ 0 & \dfrac{1}{L_\lambda} & 0 \\ 0 & 0 & \dfrac{1}{L_\lambda} \end{pmatrix}$$

$$C_c = \begin{pmatrix} 0 & 0 & 1 & 0 \\ 0 & 0 & 0 & 1 \end{pmatrix}$$

The electric torque T is given by the equation below, where $\psi_\delta$ denotes the airgap flux. Considering a machine with salient poles, the combination of setpoint currents $i_d$ and $i_q$ provides a degree of freedom to minimize the power loss in the machine for a certain torque. Here considering a three phase machine with pole number n.

$$T = i \times \psi_\delta = \frac{3n}{2}(\psi_\delta^d i_q - \psi_\delta^q i_d) = \frac{3n}{2}((\psi_s^d - L_\lambda i_d) i_q - (\psi_s^q - L_\lambda i_q) i_d) =$$

$$\frac{3n}{2}(\psi_s^d i_q - \psi_s^q i_d) = \frac{3n}{2}(\psi_m i_q + i_d i_q (L_d - L_q))$$

where $\psi_s{}^d$ and $\psi_s{}^q$ denotes direct and quadrature components of the stator flux, $L_d = L_m{}^d + L_\lambda$, and $L_q = L_m{}^q + L_\lambda$. It is appreciated that, by incorporating saturation in the model, the inductances $L_d$, $L_q$ depend on the current set-point, i.e., $L_d(i_d, i_q)$, $L_q(i_d, i_q)$. For a permanent magnet synchronous machine with salient poles, there are at least two degrees of freedom in choice of current references. Hence, it is possible to find a current reference vector that minimizes the power loss in each working point of operation unless operating on the boundary. The steady state power losses are defined in the following relation which also is the objective function for the optimization.

$$f(x) = 3/2(r(i_d{}^2 + i_q{}^2) + r_c{}^d(i_d - i_m{}^d)^2 + r_c{}^q(i_q - i_m{}^q)^2)$$

where $$x = (i_m{}^d, i_m{}^q, i_d, i_q, v_d, v_q)$$

Hence, for a certain torque set-point $T^{sp}$ ($\omega$, $U_{dc}$) in terms of the motor axle speed $\omega$ and the voltage $U_{dc}$ behind the inverter, and a minimum power loss set-point $p^{sp}$, the optimization problem to be solved can be represented as $$\min_x f(x) \text{ subject to}$$

$$d(x) \leq 0$$

$$d_{eq}(x) = 0$$

$$l_b \leq x \leq u_b$$

where $l_b$ and $u_b$ are lower and upper bounds which can be configured according to any constraints in place on the EM state. The non-linear non-equality constraints yield for motor mode of operation $$d(x) = \begin{pmatrix} -U_m + \sqrt{v_d^2 + v_q^2} \\ -I_{max} + \sqrt{i_d^2 + i_q^2} \\ i_d \\ p^{sp} - f(x) \end{pmatrix}$$

and the non-linear equality constraints are given by $$d_{eq}(x) = \begin{pmatrix} T^{sp}(\omega, U_{dc}) - \frac{3n}{2}(\psi_m i_m{}^q - (L_d - L_q)i_m{}^d i_m{}^q) \\ A_{eq}^p x - b_{eq}^p \end{pmatrix}$$

where $$A_{eq}^p = \begin{pmatrix} -r_c{}^d & \omega L_m{}^q & r_c{}^d & 0 & 0 & 0 \\ -\omega L_m{}^d & -r_c{}^q & 0 & r_c{}^q & 0 & 0 \\ r_c{}^d & 0 & -r_c{}^d + r & \omega L_\lambda & 1 & 0 \\ 0 & r_c{}^q & \omega L_\lambda & -(r_c{}^q + r) & 0 & 1 \end{pmatrix}$$

and $$b_{eq}^p = (0 \quad \omega \psi_m \quad 0 \quad 0)^T$$

Figure 4:
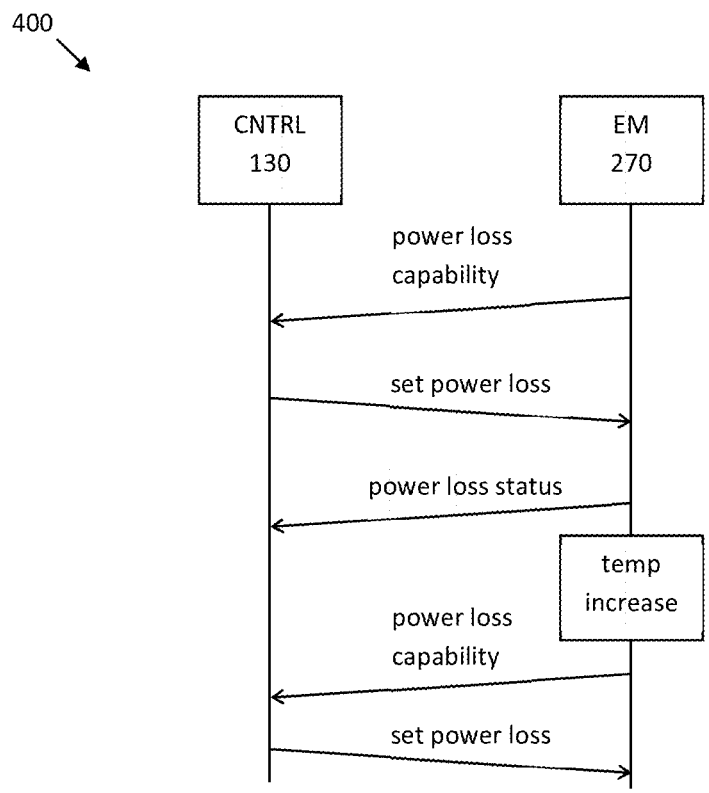
FIG. 4 is a signaling chart illustrating messaging in a control system.

FIG. 4 shows an example signaling diagram which illustrates the disclosed methods in terms of signaling over the interface 135 between vehicle control unit 130 and the EM subsystem control unit 270. In this example, the EM subsystem control unit first reports a power loss capability to the vehicle control unit. Based on the capabilities of the EM sub-system the vehicle control unit 130 then uses the interface 130 to the EM control unit 270 to set a desired power loss. This configuration is then acknowledged by the EM control unit by means of a power loss status message. In this example, the temperature of the electric machine then increases. To protect the components of the EM subsystem from overheating, a new lower power loss capability is reported to the vehicle control unit over the interface. This new capability report may result in an updated power loss setting by the vehicle control unit. Of course, the vehicle control unit 130 may respond to the new capability report in other ways. For instance, the vehicle control unit 130 may perform a different force allocation over the different vehicle motion support devices in order to reduce the torque requests on the EM subsystem reporting a reduced power loss capability. This way the vehicle control unit 130 can also balance energy dissipation over the whole vehicle combination. FIG. 4 illustrates an example operation of the signaling interface 135, shown in FIG. 2, for exchanging data between the vehicle control unit 130 and the EM control unit 270, i.e., a signaling interface arranged to carry a request from the vehicle control unit 130 to the EM control unit 270 indicating a desired efficiency level for operation by the EM.

Figure 5:
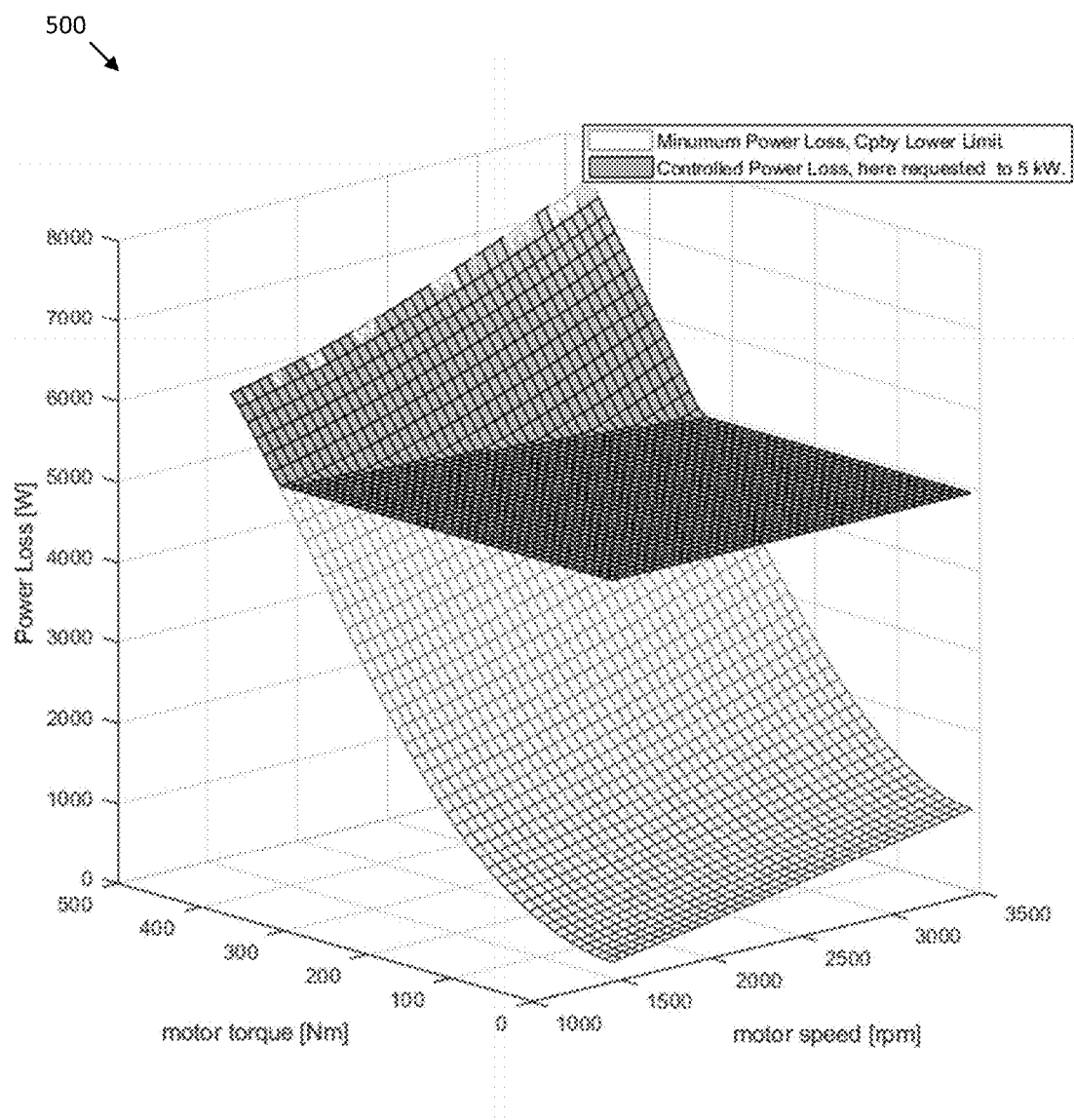
FIG. 5 is a graph showing power loss as function of motor torque and motor speed.

The interface between the vehicle control unit 130 and the EM subsystem 110, comprising the EM control unit 270, deserves some special attention. To allow full flexibility in configuring different efficiency levels of the EM, while at the same time maintaining a robust and safe vehicle operation, the methods may comprise sending S32 a requested power loss from the vehicle control unit 130 to the EM control unit 270. This requested power loss may, as noted above, conveniently be defined relative to a nominal efficiency level or relative to some maximum obtainable efficiency level. FIG. 5 shows an example 500 where the desired power loss has been configured at 5 kW. It is noted that this power loss is maintained for a wide range of desired motor torques and motor speeds. In fact, it is noted that the EM subsystem is even able to sustain a power loss at zero generated torque. In other words, the EM subsystem may also assume a role similar to a braking resistance which can be used to dissipate energy even if no torque is generated by the electric machine.

The methods disclosed herein optionally also comprise sending S33 a power loss status report from the EM control unit 270 to the vehicle control unit 130. This power loss status report may comprise information such as, e.g., a current setting of power loss, allowing the vehicle control unit to verify that a requested power loss is actually in effect. As mentioned above, the EM control unit may also be configured to send S34 a power loss capability report to the vehicle control unit 130, thus informing the vehicle control unit 130 about what ranges of power losses that can be supported currently. This capability report may also comprise a prediction regarding a time period during which a current power loss can be sustained. This prediction can, e.g., be based on a rate of increase in temperature of the electric machine, and possibly also on past experiences during similar operating conditions, of which data has been stored in memory. In other words, the power loss capability report is optionally determined S35 based on a temperature level of the EM 110.

With reference to FIG. 2, most FC stacks 240 should, for durability reasons, not be stopped and re-started frequently. Hence it is desired that the FC stack 240 provides a minimum power output even if the power is not needed for propulsion. To allow for this constant generation of energy even when the ESS is fully charged, the method may comprise configuring S36 the efficiency level of the EM 110 in dependence of a minimum power output of an FC stack 240 in the vehicle 100.

The efficiency level of an electric machine is often a function of axle speed. Therefore, the method may also comprise configuring S37 a gear ratio associated with a transmission of the heavy-duty vehicle 100 in order to adjust the efficiency level of the EM.

Figure 6:
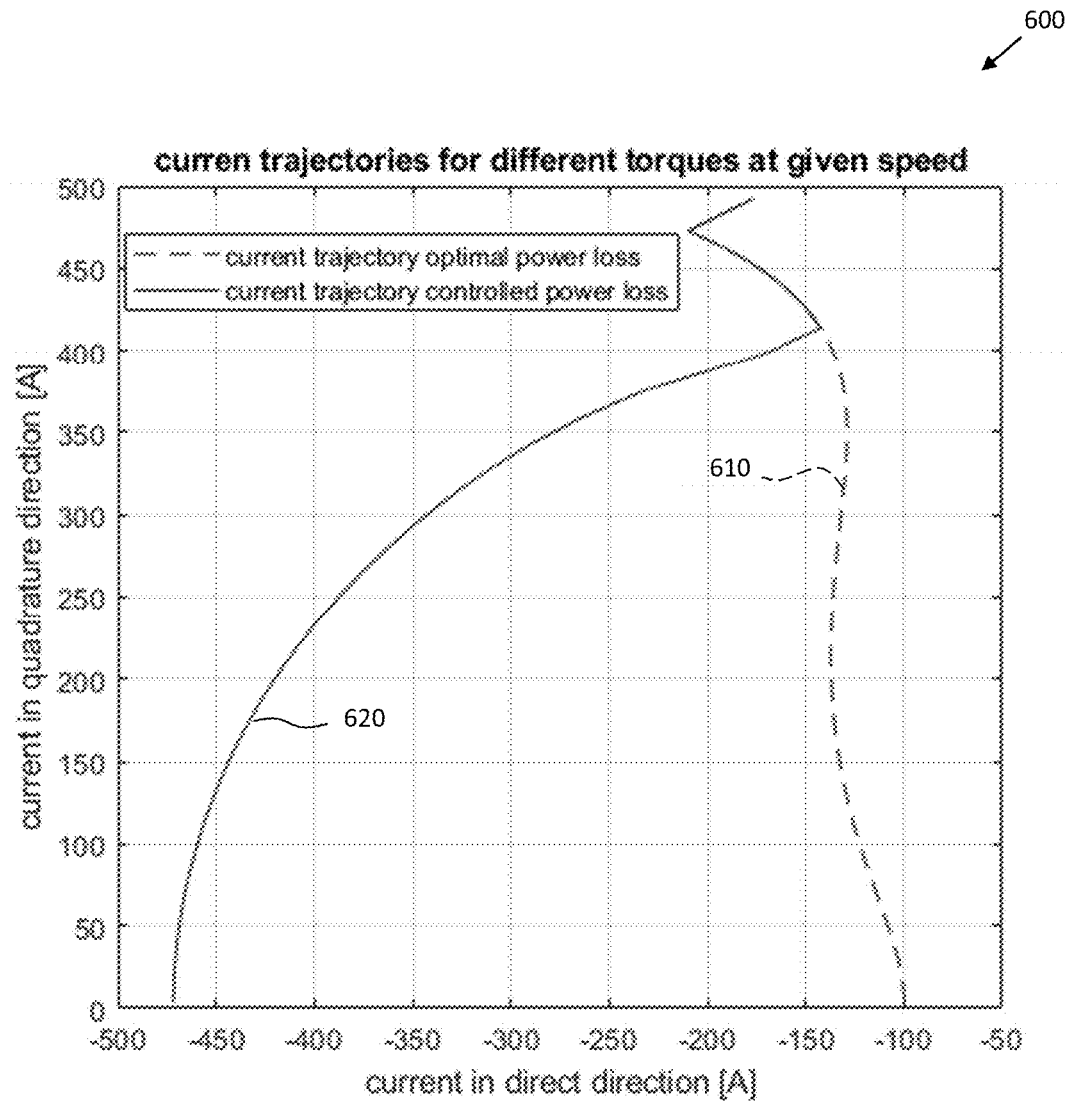
FIG. 6 is a graph illustrating example current trajectories.

FIG. 6 illustrates example current trajectories 600 for different levels of torque at a given electric motor speed. It is seen that an optimal (minimum) power loss trajectory 610 shows a certain behavior, while the controlled power loss 620 (larger than the optimal one) shows a different trajectory. The controlled power loss curve 620 has a larger magnitude direct current compared to the optimal power loss trajectory. The curves shown in FIG. 6 are the results of optimizations performed under different constraints. The optimal power loss curve is the result of an optimization performed with an objective to minimize the power losses in the electric machine (which is the standard mode of operating an electric machine). The controlled power loss curve is the result of an optimization which has been performed under the constraint that the power low should be a given value, here 5 kW as in FIG. 5.

When comparing the two curves 610, 620 in FIG. 6, it is seen that the curve associated with a desired power loss value has an increase magnitude of current in the direct direction, i.e., an increase in the reactive current of the electric machine.

FIG. 8 schematically illustrates, in terms of a number of functional units, the components of a control unit such as the ECU 101. The control unit may implement one or more of the above discussed functions of the TSM, VMM and/or the MSD control function, according to embodiments of the discussions herein. The control unit is configured to execute at least some of the functions discussed above for control of a heavy-duty vehicle 100. Processing circuitry 810 is provided using any combination of one or more of a suitable central processing unit CPU, multiprocessor, microcontroller, digital signal processor DSP, etc., capable of executing software instructions stored in a computer program product, e.g., in the form of a storage medium 820. The processing circuitry 810 may further be provided as at least one application specific integrated circuit ASIC, or field programmable gate array FPGA.

Particularly, the processing circuitry 810 is configured to cause the control unit 101 to perform a set of operations, or steps, such as the methods discussed in connection to FIG. 7. In other words, FIG. 8 schematically illustrates a vehicle control unit 800 for controlling an electric machine 110 of a heavy-duty vehicle 100, where the heavy-duty vehicle comprises an energy storage system 120 connected to the EM 110. The control unit 800 comprises processing circuitry 810 configured to obtain S1 an energy absorption capability of the ESS 120, determine S2 an amount of regenerated energy by the EM 110 during braking, and configure S3 an efficiency level of the EM 110 in dependence of the energy absorption capability of the ESS 120 and the amount of regenerated energy by the EM 110 during braking.

For example, the storage medium 820 may store the set of operations, and the processing circuitry 810 may be configured to retrieve the set of operations from the storage medium 820 to cause the control unit 101 to perform the set of operations. The set of operations may be provided as a set of executable instructions. Thus, the processing circuitry 810 is thereby arranged to execute methods as herein disclosed.

The storage medium 820 may also comprise persistent storage, which, for example, can be any single one or combination of magnetic memory, optical memory, solid state memory or even remotely mounted memory.

The control unit 101 may further comprise an interface 830 for communications with at least one external device. As such the interface 830 may comprise one or more transmitters and receivers, comprising analogue and digital components and a suitable number of ports for wireline or wireless communication.

The processing circuitry 810 controls the general operation of the control unit 101, e.g., by sending data and control signals to the interface 830 and the storage medium 820, by receiving data and reports from the interface 830, and by retrieving data and instructions from the storage medium 820. Other components, as well as the related functionality, of the control node are omitted in order not to obscure the concepts presented herein.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

The invention claimed is:

1. A method performed in a vehicle control unit for controlling an electric machine (EM) of a heavy-duty vehicle, wherein the heavy-duty vehicle comprises an energy storage system (ESS) connected to the EM, the method comprising:
obtaining an energy absorption capability of the ESS,
determining an amount of energy regenerated by the EM during braking,
configuring a power loss level of the EM in dependence of the energy absorption capability of the ESS relative to the amount of energy regenerated by the EM during braking; and
determining a temperature of a brake resistor comprised in the ESS.

2. The method of claim 1, further comprising determining a state of charge (SoC) of a battery pack comprised in the ESS.

3. The method of claim 2, further comprising determining a temperature of the battery pack comprised in the ESS.

4. The method of claim 1, further comprising determining a state of a retarder system arranged to provide a braking torque to prevent acceleration of the heavy-duty vehicle.

5. The method of claim 1, further comprising measuring an amount of energy regenerated by the EM.

6. The method of claim 1, further comprising predicting an amount of energy regenerated by the EM based on a planned route of the vehicle.

7. The method of claim 1, further comprising determining a maximum amount of energy regenerated by the EM based on a vehicle load and an endurance braking requirement of the vehicle.

8. The method of claim 1, further comprising configuring an efficiency level of the EM as a D/Q setpoint determined under constraints of a desired motor torque and power loss level.

9. The method of claim 1, further comprising sending a requested power loss from the vehicle control unit to an EM control unit.

10. The method of claim 9, further comprising sending a power loss status report from the EM control unit to the vehicle control unit.

11. The method of claim 9, further comprising sending a power loss capability report from the EM control unit to the vehicle control unit.

12. The method of claim 11, wherein the power loss capability report is determined based on a temperature level of the EM.

13. The method of claim 1, further comprising configuring an efficiency level of the EM in dependence of a minimum power output of a fuel cell stack.

14. The method of claim 1, further comprising configuring a gear ratio associated with a transmission of the heavy-duty vehicle.

15. A computer program comprising program code means for performing the steps of claim 1 when the program is run on a computer or on processing circuitry of a control unit.

16. A computer readable medium carrying a computer program comprising program code means for performing the steps of claim 1 when the program product is run on a computer or on processing circuitry of a control unit.

17. A vehicle control unit for controlling an electric machine (EM) of a heavy-duty vehicle, wherein the heavy-duty vehicle comprises an energy storage system (ESS) connected to the EM, the control unit comprising processing circuitry configured to:

obtain an energy absorption capability of the ESS, determine an amount of energy regenerated by the EM during braking, and configure an efficiency level of the EM in dependence of the energy absorption capability of the ESS and the amount of energy regenerated by the EM during braking, and determine a temperature of a brake resistor comprised in the ESS.

18. A vehicle comprising the vehicle control unit of claim 17.

* * * * *